Figure 1:
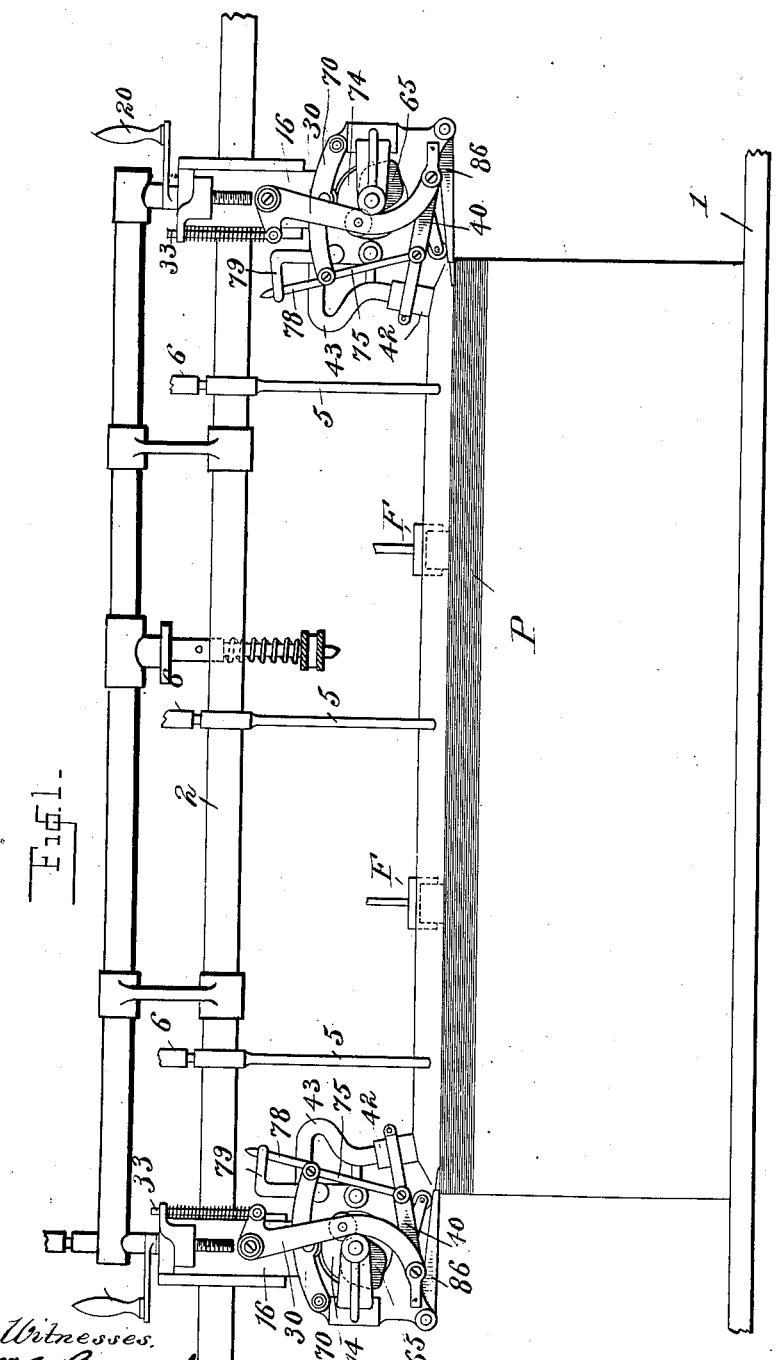

No. 754,203. PATENTED MAR. 8, 1904.
T. C. DEXTER.
PAPER FEEDING MACHINE.
APPLICATION FILED JULY 31, 1901.
NO MODEL. 6 SHEETS—SHEET 1.

Witnesses.
Inventor.

No. 754,203. PATENTED MAR. 8, 1904.
T. C. DEXTER.
PAPER FEEDING MACHINE.
APPLICATION FILED JULY 31, 1901.
NO MODEL. 6 SHEETS—SHEET 4.

Witnesses. Inventor.

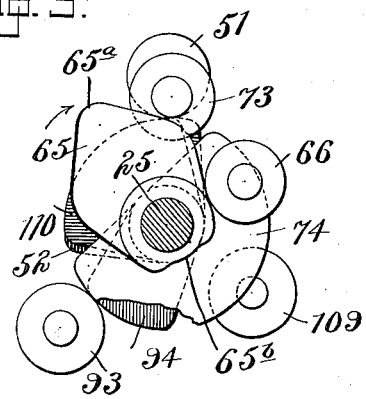
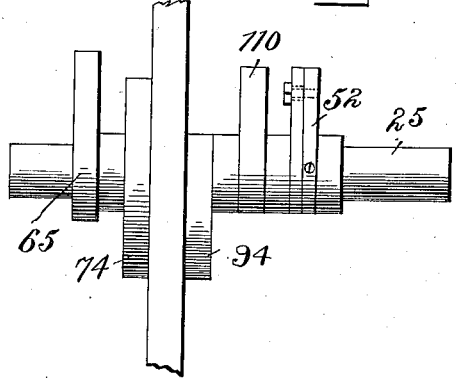
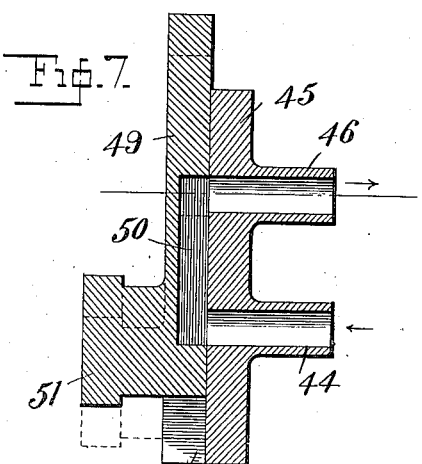
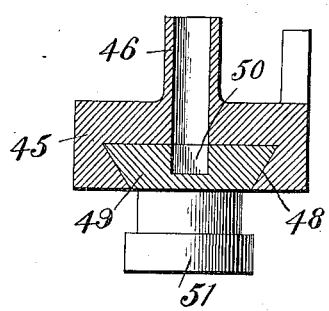
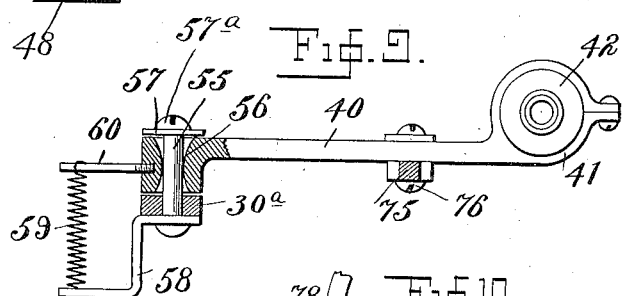

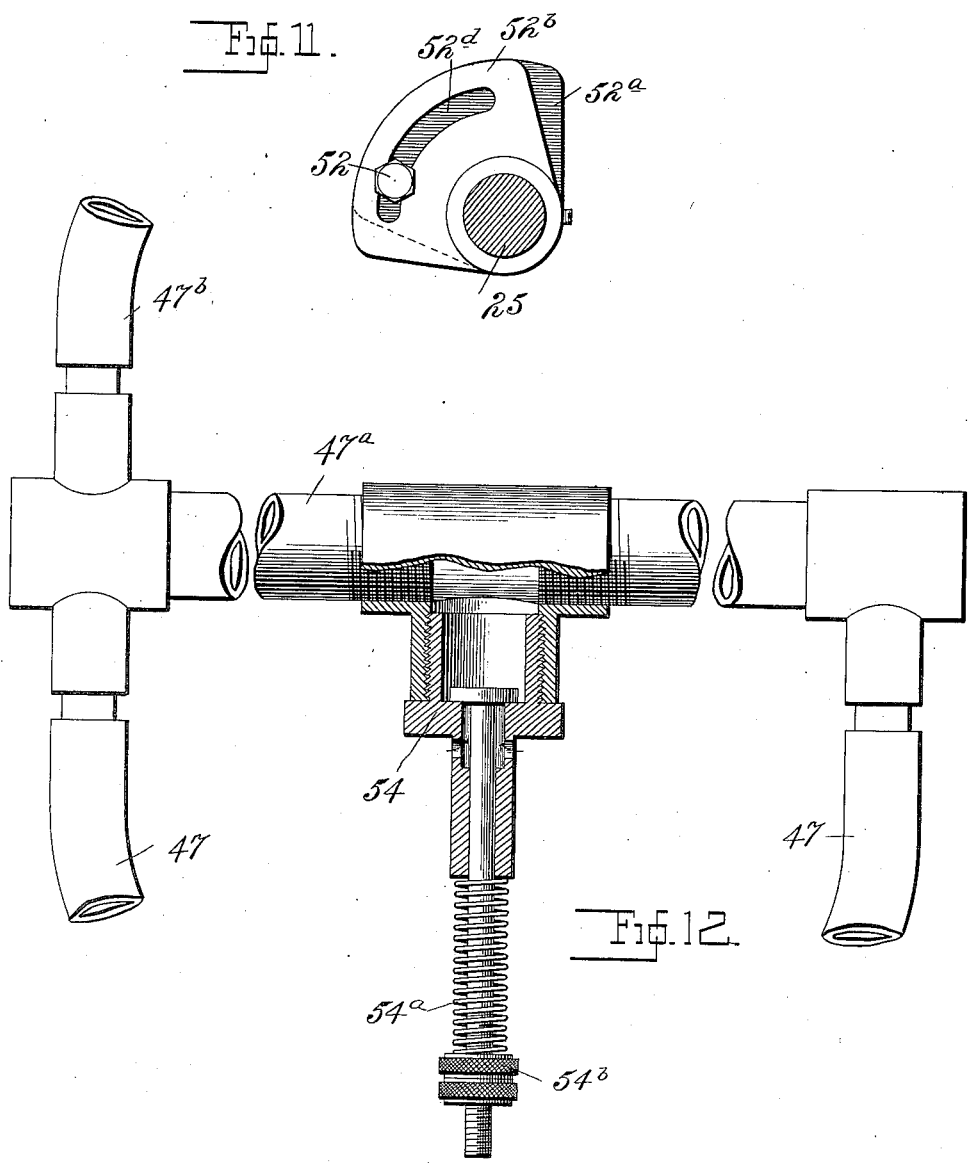

No. 754,203. Patented March 8, 1904.

UNITED STATES PATENT OFFICE.

TALBOT C. DEXTER, OF PEARL RIVER, NEW YORK.

PAPER-FEEDING MACHINE.

SPECIFICATION forming part of Letters Patent No. 754,203, dated March 8, 1904.

Application filed July 31, 1901. Serial No. 70,329. (No model.)

*To all whom it may concern:*

Be it known that I, TALBOT C. DEXTER, a citizen of the United States, residing at Pearl River, in the county of Rockland and State of New York, have invented certain new and useful Improvements in Paper-Feeding Machines, of which the following is a specification.

My present invention relates to improvements in the style of paper-feeding machines covered by Patent No. 659,510, granted to me October 9, 1900.

In this patent I have disclosed a sheet-buckling separating mechanism for paper-feeding machines comprising a pair of suctional buckling devices arranged to operate over one edge of a pile of sheets and adapted to buckle a sheet at its corners, raise the buckled edge of the sheet from the pile, shift the sheet bodily upon the pile, hold the raised edge in elevated position while air is blown under the partially-separated sheet, and finally release the buckled raised edge of the sheet in elevated position immediately after the feed devices engage the sheet to feed it from the pile.

In operating paper-feeding machines upon large sheets of certain kinds of paper, especially when the sheets have been previously printed, there are frequently portions of the sheets which adhere more tightly than other portions, rendering it very difficult to feed the sheets because it is very difficult to properly separate and free them from the pile. This is true particularly of large printed sheets having heavy patches of ink upon their surfaces—such, for instance, as is found in lithographic work. When such jobs are encountered, the usual method of attempting to overcome the difficulty is by blowing a greater quantity and stronger blasts of air under the sheets and specially directing the air-blasts toward the points in the sheets which cause the trouble. The difficulty is only partially overcome in this way, and many times it is necessary to take the job off of the feeding-machine and feed the sheets by hand. When strong blasts of air are used for separating the sheets, it is also necessary to apply pressure upon some part of the sheet to prevent the wind blowing the sheet out of alinement with the pile. This is also objectionable.

To overcome the objections to paper-feeding machines now commonly used and to further perfect the sheet moving and separating mechanism of my above-named patent, No. 659,510, I have devised the improvements which I desire to cover by my present application.

To this end my invention consists mainly of a sheet moving or separating instrument having means for taking a positive hold upon a sheet, means for reciprocating transversely of the pile and raising and lowering the instrument, and means for moving the instrument longitudinally of the pile or laterally with relation to its direction of reciprocation, whereby a sheet may be buckled at or near one edge, the buckled edge raised from the pile, and the entire sheet shifted bodily upon the pile to insure absolutely against the adherence of the top sheet with the pile at any point throughout its surface. This shifting bodily of the sheet upon the pile may be in any direction, but in my present embodiment of the invention I shift the sheet rearwardly.

The separating instruments of my present application differ from those of my above-named patent in that the instruments in the present case are moved laterally to shift the sheet bodily upon the pile, whereas in the said patent the vertical movements of the instruments are relied on to effect the shifting of the sheet upon the pile.

Another feature of my present invention is the provision of means for stretching the buckled partially-separated edge of the sheet while it is elevated from the pile, so as to further insure the shifting and separation of the sheet and a better distribution of the air under the sheet when the air-blasts are used and prevent the improper shifting of the sheet out of register with the pile.

My improved sheet-separating mechanism may be used with or without the air-blast devices. If the air-blast devices are used for directing currents of air beneath the separated sheet, my improved mechanism will cause the air-currents to be properly distributed, or if the air-blast devices are not used the movement of the separated sheet, acted upon by my improved mechanism, will cause air to be drawn in under the sheet to a sufficient extent to properly separate it from the pile.

My invention consists of certain other features of novelty, and in order that my invention may be fully understood I will first describe the same with reference to the accompanying drawings and afterward point out the novelty with more particularity in the annexed claims.

Figure 2:
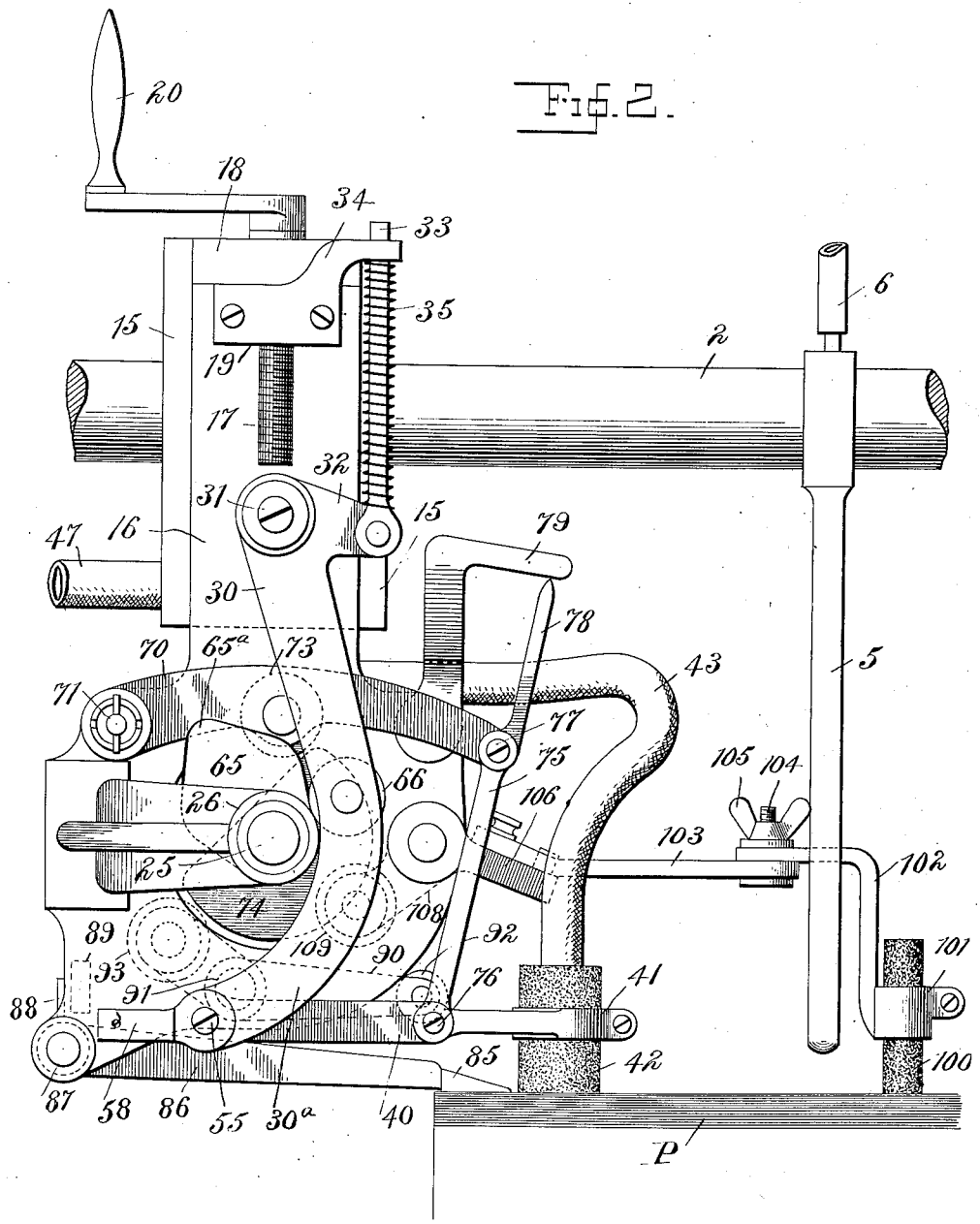
Figure 3:
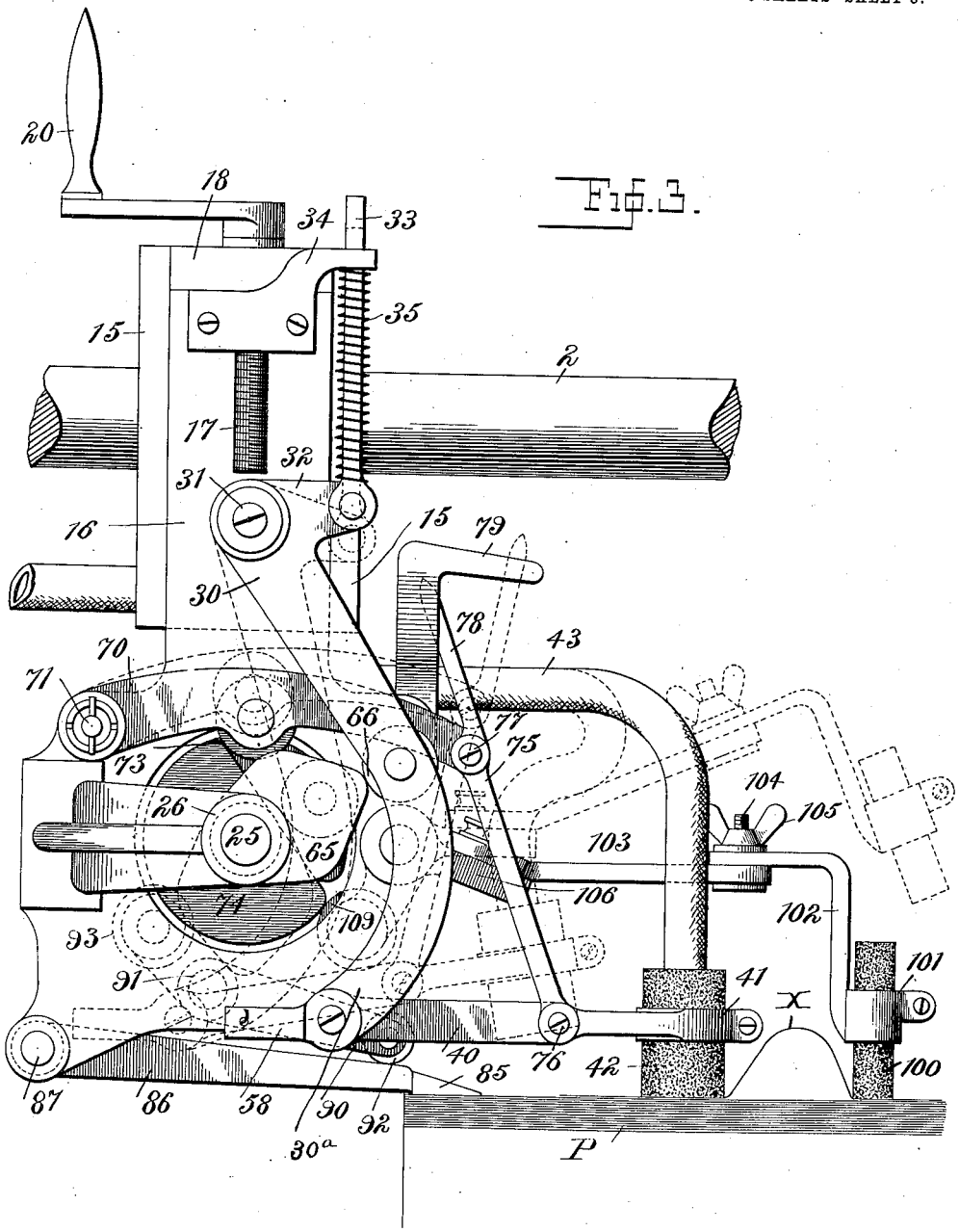
Figure 4:
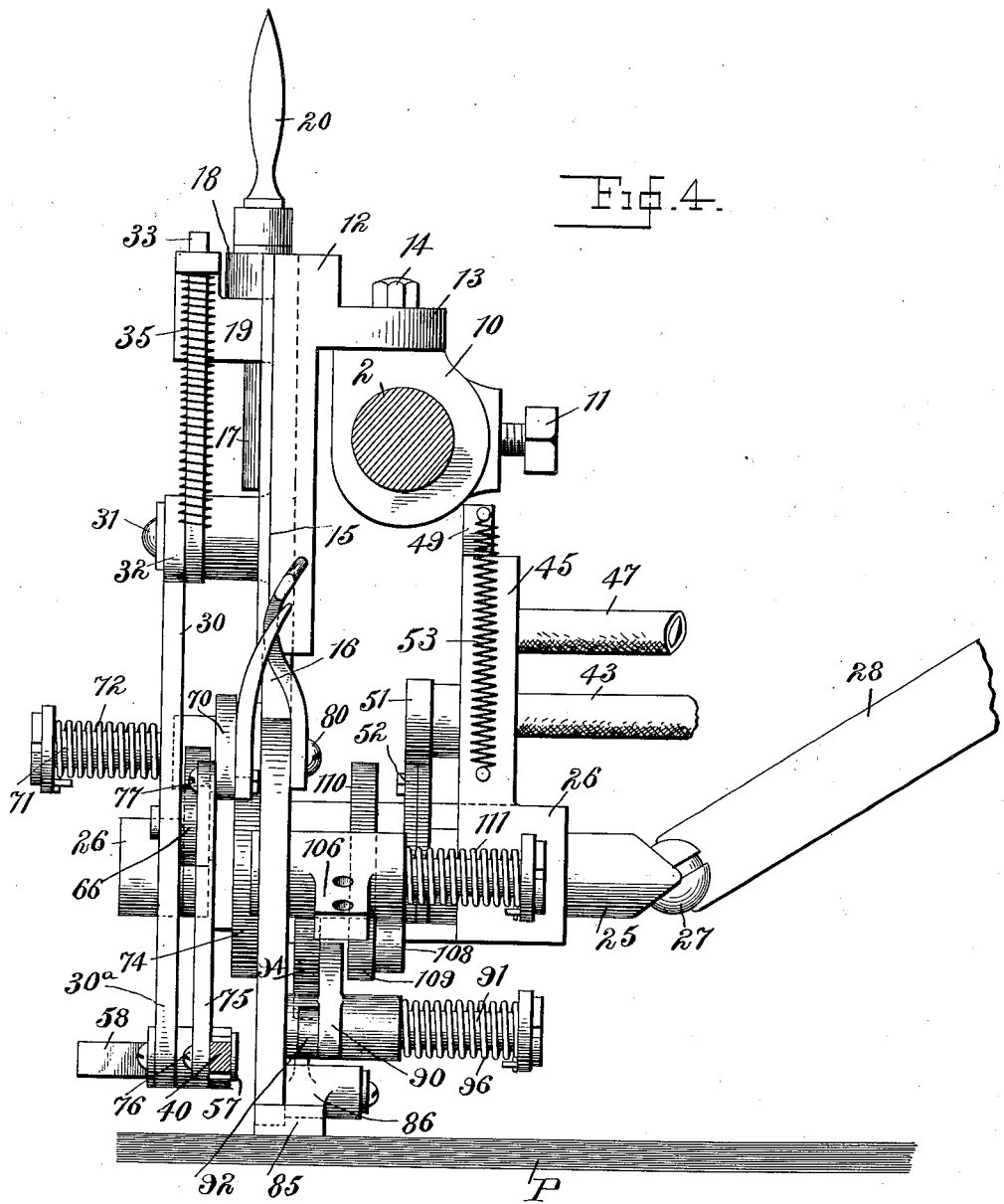

In said drawings, Figure 1 is a partial rear elevation of a paper-feeding machine, illustrating my invention. Fig. 2 is a similar view of one of the sheet-buckling mechanisms, showing the parts in the position assumed at the beginning of the separating operation. Fig. 3 is a view similar to Fig. 2, showing the parts of the mechanism in an intermediate position of their operation. Fig. 4 is an edge elevation of the same, parts being in section and parts removed. Figs. 5 and 6 are diagrammatic views representing the relative arrangement of the cams upon the operating-shaft for actuating the several parts of my improved separating mechanism. Figs. 7 and 8 are vertical and transverse sectional views of the valve controlling the suctional buckler. Fig. 9 is a sectional plan view of the sheet-buckling finger. Fig. 10 is a detail sectional view illustrating a connection between two of the operating parts of the buckling-finger. Fig. 11 is a detail face view of one of the adjustable cams which operate the valves controlling the suction of the buckling-fingers. Fig. 12 is a detail plan view illustrating the safety relief-valve for regulating the vacuum in the suction-cups of the buckling-fingers.

The pile of paper P to be fed to the folder, printing-press, or other machine is mounted upon an automatically-adjustable platform or table 1, which may be mounted and operated in the usual manner. The side frames of the feeding-machine to which my improvements are applied are not illustrated in the drawings. Suitably supported from the ordinary side frames above the pile-supporting table 1 is a suitable frame upon which the sheet-buckling separating mechanisms are supported. I have shown only the rear transverse bar 2 of this supporting-frame. This bar 2 is adapted to be adjusted longitudinally of the feeding-machine, so as to support the sheet-separating mechanisms and the air-blast devices (when used) in proper position above the rear edge of a pile of sheets which is to be fed from the table or platform. The two sets of sheet-separating mechanism are adjustably mounted upon this rear supporting-bar 2, so as to be capable of adjustment transversely of the pile.

5 5 5 represent the ordinary air-blast tubes adjustably mounted upon the supporting-bar 2 and having air-pipe connections 6 with any suitable blower. (Not shown.) There may be any desired number of these air-blast pipes 5, the number and disposition of them depending upon the size of the sheets to be operated upon and the nature of the paper and of the printing upon the paper if the sheets have been previously printed. I show in Fig. 1 of the drawings a desirable arrangement of three of the blast-pipes.

I will now describe my improved sheet-buckling separating mechanism, of which there are two sets arranged at opposite sides above the rear edge of the pile. Both sheet-buckling mechanisms are of the same construction and a description of one will be sufficient for both.

10 is a suitable bracket adjustably mounted upon the supporting-bar 2 and secured in the desired adjusted position by a set-screw 11.

12 is a vertically-extending guide-bracket formed with a horizontal ear 13, through which passes a vertical set-screw 14 for securing the bracket 12 to the bracket 10 in the desired adjusted position. The bracket 12 is formed in its rear vertical face with guide-flanges 15, between which is mounted the vertically-adjustable buckler-frame 16, formed with an upper oblong portion which fits between and slides in the guide-flanges 15 of bracket 12 and a lower bracket portion of suitable shape to properly support the operative parts of the mechanism hereinafter referred to. An adjusting-screw 17 is journaled in a lug 18 on bracket 12 and threaded through a nut 19, secured to the vertically-sliding buckler-frame 16. This adjusting-screw 17 has a crank-handle 20 for operating it. By operating the screw 17 the buckler mechanism can be adjusted vertically with relation to the pile of sheets.

25 is the buckler-operating shaft, which is journaled in suitable bearings 26, formed upon the lower bracket portion of buckler-supporting frame 16. This short shaft 25 has universal-joint connection 27 with an operating-shaft 28, which is adapted to be driven from the main shaft of the feeding-machine in any suitable manner. (Not shown.) Mounted upon the shaft 25 between its supporting-bearings are several cams which operate the different parts of the sheet-separating mechanism. These cams will be referred to in connection with the said parts of the mechanism.

30 is the supporting and operating lever of the buckling-finger proper. This lever 30 is journaled at 31 to the face of the buckler-supporting frame 16 and has a heel or lug 32 projecting from it adjacent to its journal, to which lug 32 is journaled a vertically-extending rod 33, which passes up through a guide-bracket 34, which is secured to the outer face of the nut 19 of the buckler-supporting frame. A spiral spring 35 surrounds the rod 33 and is confined between the bracket 34 and the lower end of the rod 33. The spring 35 tends to move the lower curved end 30ª of the lever 30 outwardly or to the left of Figs. 2 and 3.

40 is the buckler-finger proper, formed with a yoked forward end 41, in which is mounted a suction-cup 42, formed of a tubular rubber block, on which is adapted to engage a sheet of paper by reason of its frictional qualities and also by reason of the suction which is created in it by the arrangement presently to be described.

Extending up from the tubular rubber block 42 is a flexible air-tube 43, which leads to the lower tubular projection 44, formed on the forward face of the valve-casing 45, which is mounted upon the lower bracket portion of the buckler-supporting frame 16. This valve-casing 45 also has an upper tubular projection 46, from which extends a flexible tube 47, which leads to a pipe $47^a$ of any suitable air-pump or other device for exhausting the air from the cups of the buckling-fingers. The exhaust-pipe $47^a$ is common to both buckling mechanisms and has means for maintaining the proper vacuum therein, as hereinafter described. The rear face of the valve-block 45 has a vertical dovetailed channel 48 cut into it, in which dovetailed channel 48 slides the vertically-movable valve-plate 49 of dovetailed cross-section. The valve-plate 49 has a recess 50 cut in its inner face, which is adapted to form communication between the inlet 44 and outlet 46 to place the suction-cup 42 of the buckling-finger in direct communication with the air-exhausting apparatus. Formed on the rear face of the valve-plate 49 is a lug or projection 51, which rests in the vertical plane of a sectional operating-cam 52, which is secured to the buckler-operating shaft 25. This sectional cam 52 and its purpose will presently be described.

53 is a spiral spring connecting the upper end of the valve-plates 49 with the valve-casing 45 to cause lug 51 to follow the sectional operating-cam 52 and give the valve a spring tendency to close communication through tubes 44 46.

The cam 52 is formed of two parts $52^a$ and $52^b$, one of which, $52^a$, is adjustably secured to the shaft 25, while the other section, $52^b$, is adjustably secured to the section $52^a$ by means of a set-screw $52^c$, passing through slot $52^d$ in section $52^b$ and screw-seated in the cam-section $52^a$. In adjusting this cam it is first set in proper position upon the operating-shaft 25 to cause the suction in the cup 42 of the buckling-finger to be cut off at the proper moment with relation to the operation of the feeding-off mechanism—that is, the suction should be cut off immediately after the feeding-off mechanism engages the sheet. The adjustable cam-section $52^b$ is then adjusted to regulate the moment of starting the suction in buckling-finger cup 42. This adjustment of the operation of the valve, which regulates the suction of the buckling-finger, is particularly important, because when operating upon some kinds of paper it is necessary to have the suction of the buckling-finger start immediately when the buckling-finger begins its inward or buckling movement, while with other kinds of paper—such, for instance, as paper having a very light glaze, which is more or less porous—the suction should not begin until the buckling-finger has performed a part of its buckling stroke and has partially buckled the sheet by friction, because if the suction started before the sheet was partially separated the porosity of the paper would in some cases cause more than one sheet to be buckled.

In operating with suctional sheet-moving instruments it is very desirable to provide means for regulating the suctional power of the instruments to suit various grades of paper, heavy paper being able to stand a stronger suction than light paper. For this purpose I provide a spring relief or safety valve, such as 54, in one of the air-pipes, as shown in Fig. 12 of the drawings, such valve having a spring $54^a$ for keeping it normally closed and an adjusting device $54^b$ for regulating the pressure at which it will automatically open and allow the entrance of air for preventing the exhaust in the pipes becoming too great. By this arrangement the suctional grip of the buckling-fingers can be regulated to a nicety. In operating upon light porous paper the spring-pressure of the relief-valve is adjusted so that it will allow only a light suction in the cups of the buckling-fingers. This will prevent buckling more than one sheet at once. If a heavier paper is being operated upon, the relief-valve is adjusted to hold a stronger vacuum.

The relief-valve is preferably placed in the common exhaust-pipe $47^a$, but may be placed at any desirable point. $47^b$ is a flexible tube leading from pipe $47^a$ to the suction-pump. The relief-valve is also important in maintaining the suction of the buckling-fingers at a sufficiently low degree to enable the feeding-off devices to readily pull the separated sheet away from the buckling-fingers.

The buckling-finger 40 is journaled loosely at its rear end upon a pin 55, mounted in the lower end $30^a$ of the lever 30. The transverse bearing-opening 56 of the buckling-finger 40 is reamed out or enlarged at its outer ends and contracts gradually toward the center, so as to allow the buckling-finger to move laterally as well as vertically upon the pivot-pin 55. The finger 40 is loosely confined upon its pivot-pin by a washer 57 and screw $57^a$. A bracket-arm 58 is also secured to the lower end $30^a$ of the lever 30, and a spring 59 connects the bracket 58 with a pin 60, projecting rearwardly from the buckling-finger 40. The spring 59 serves to hold the buckler-finger in its normal position and at the same time allow it to have proper lateral play when operated upon by the mechanism presently to be described.

Keyed to the operating-shaft 25 is a cam 65, having an extreme eccentric portion 65$^a$ and a diametrically opposite cut-out portion 65$^b$. The cam 65 operates upon an antifriction-roller 66, journaled in the buckler supporting and operating lever 30, and by the rotation of the cam 65 the buckling-finger 40 is moved inwardly and outwardly over the pile of sheets. The limit of the inward motion is caused by the extreme eccentric portion 65$^a$. The cut-out portion 65$^b$ of the cam allows the buckler-finger to be drawn outwardly a little beyond its normal position of starting, and when the buckling-finger is drawn outwardly to this extreme position the finger is in elevated position with the sheet attached. This position is that of stretching the sheet laterally, as will be hereinafter explained.

70 is a lever journaled to the buckler-supporting frame upon a pin 71 and having a spring 72 for imparting to it a downward-spring tendency. The lever 70 carries an antifriction-roller 73, which operates upon the periphery of a semicircular cam 74, keyed to the operating-shaft 25. Journaled loosely at the inner end of the lever 70 upon a pivot-pin 77 is a link 75, which is in turn journaled at its lower end 76 to the buckling-finger 40. The link 75 is squared upon or otherwise rigidly secured to the end of the pivot-pin 77. The point of connection between the lever 70 and link 75 is shown in Fig. 10 of the drawings, the transverse bearing-opening 70$^a$ in the lever 70 being reamed out or enlarged at its outer ends and contracts toward its center, and the outer surfaces 70$^b$ of the end of lever 70 are curved or convexed for the purpose of allowing a relative lateral rocking of the link 75, pin 77, and finger 78 upon the lever 70. This loose joint is to compensate for the lateral movement of the buckler-finger upon its loose joint, as just explained. 78 is an upwardly-projecting curved finger squared upon or otherwise rigidly secured to the pivot-pin 77 and adapted when the buckler-finger is elevated to engage a curved bracket-arm 79, which is mounted at 80 upon the buckler-supporting frame 16. The link 75 and finger 78 being rigidly secured to the opposite ends of the pivot-pin 77 will move as an integral part. The purpose of the finger 78 and bracket-arm 79 is to cause the buckling-finger to be moved laterally upon its supporting-lever 30— that is, rearwardly of the pile when it is raised from the pile—and be held in this shifted position while it is in raised position and being returned to its initial position. This movement causes the sheet to be shifted bodily in a rearward direction upon the pile. The lever 70 and its operating-cam 74 and spring 71 cause the elevation and lowering of the buckling-finger with relation to the pile of sheets.

85 is the holding-down foot or clamp mounted upon the inner end of an arm or lever 86, which is journaled upon a pin 87, mounted in the buckler-frame. A pin 88 projects upwardly from the journal end of the arm 86 in position to engage a stop-flange 89 on the buckler-frame for the purpose of preventing the holding-down foot 85 falling when there is no pile in place to support it.

90 is an arm or lever journaled at 91 upon the buckler-frame and carrying in one end an antifriction-roller 92, which is adapted to be intermittently forced into engagement with the arm 86 of the holding-down clamp 85. Journaled in the other end of the lever 90 is an antifriction-roller 93, which travels upon the periphery of a semicircular cam 94, which is keyed to the operating-shaft 25. The tension-spring 96, mounted upon the extended journal 91 of the lever 90, holds the antifriction-roller 93 in engagement with the cam, and tends to throw the antifriction-roller 92 down into engagement with the arm 86 when it is released by the low portion of the cam 94, reaching the antifriction-roller 93. The tension of spring 96 is thereby thrown upon the holding-down foot 85 for securely clamping the pile after the top sheet has been buckled from beneath the foot and while the separated sheet is being fed from the pile.

100 is the buckler stop or foot, consisting of a block of rubber mounted in a socket 101, formed in the lower end of a bent arm 102, which is mounted upon the outer end of an arm 103 by means of the bolt 104 and nut 105. The joint between arms 102 and 103 allows for the adjustment of the buckler stop or foot 100 in a horizontal plane. The arm 103 is suitably mounted upon the rock-arm 106, keyed to a short shaft 107, journaled in the buckler-frame 16 and formed integral with arm 108, carrying antifriction-roller 109, which runs upon the cam 110, keyed to the shaft 25. A tension-spring 111 is mounted upon the shaft 107 to cause the antifriction-roller 109 to closely follow the controlling-cam 110 and to hold the buckler-stop 100 down into engagement with the pile.

F F represent diagrammatically in Fig. 1 the feeding-off fingers, which may be of any suitable construction adapted to feed a separated sheet from the pile.

It will be clear that two of the improved sheet-buckling separating mechanisms are to be used, one arranged at each of the rear corners of the pile of sheets.

The operation of my improved mechanism will be clear from the following explanation: When the buckling mechanisms start to separate the top sheet from the pile, the parts are in the position shown in Fig. 2 of the drawings, the bucklers 42 are in engagement with the pile, the holding-feet 85 rest by their own weight upon the pile, and the buckler-stops 100 are in engagement with the pile. The cams 65 force the levers 30 inwardly, carrying with them the bucklers 42. If the paper is highly glazed, a strong suction in the bucklers is started the moment the bucklers start to move inwardly; but if the paper is of a softer variety the bucklers are given a part of their inward or buckling movement before the suction in the bucklers commences, and a weaker suction is used. The sheet is buckled, as indicated at X in Fig. 3, into short arches or loops, the buckles being formed between the feet 100 and the bucklers 42. Just before the two buckling-fingers (operating from opposite sides of the sheet) have reached their innermost positions the cams 110 cause elevation of the buckling-stops 100, allowing the short buckled arches X to spread out across the rear edge of the pile, while the bucklers 42 complete their inward strokes and maintain a firm suctional grip upon the buckled corners of the sheet. Immediately after this the cams 74, operating through levers 70 and links 75, will elevate the buckling-fingers 40. As the buckling-fingers are elevated the arms 78 will pass behind the curved bracket-arms 79 and by their engagement therewith will force the buckling-fingers laterally upon levers 30—that is, rearwardly of the pile—shifting the sheet bodily upon the pile. The loose joint connections between buckler-arms 40 and levers 30 and between links 75 and levers 70 will allow this lateral or rearward movement of the buckling-fingers. Immediately following the elevation and rearward or lateral movement of the buckling-fingers the levers 30 will start to move outwardly under the action of their springs 35, the cams 65 rotating to allow said movements. The buckling-fingers are moved outwardly—that is, toward the sides of the pile—while they are in elevated position, the suction in the fingers being maintained during this motion to cause the bucklers to hold onto the sheet and maintain its rear edge in elevated position. During all this time the air-blast pipes 5 (if used) are blowing air underneath the raised rear edge of the sheet. The bucklers 42 move outwardly past their initial position by reason of the antifriction-rollers 66 on levers 30 entering the extreme low portions 65$^b$ of the controlling-cams 65. The result of the receding of the buckler-fingers in elevated position to these points will be the stretching of the raised rear edge of the sheet substantially as illustrated in Fig. 1 of the drawings. This allows the air-pipes 5 to completely separate the entire sheet from the pile, the rearward shifting of the sheet previous to the stretching of its rear edge being effective in separating any spots which might have adhered. Immediately following the stretching of the rear edge of the sheet as described and just prior to the moment when the suction in the buckling-fingers is broken by the operation of the controlling-valve the feeding-off fingers engage the sheet and start it from the pile. The spring-pressure upon the holding-down clamps is applied immediately after the corners of the top sheet are withdrawn from beneath them.

I desire to claim, broadly, a sheet-separating instrument which is adapted to first move transversely of the pile to buckle a sheet and then move longitudinally of the pile or laterally of its direction of buckling to shift the sheet bodily upon the pile. The direction of movement of the sheet after it is buckled is not essential to my invention; but I prefer to shift it rearwardly, as described. I also desire to claim, broadly, a sheet-separating instrument of the pneumatic type which is adapted to first buckle a sheet at or near its edge, then raise the buckled edge of the sheet, and finally move laterally of its direction of buckling to shift the partially-separated sheet upon the pile.

I also desire to claim, broadly, a sheet-buckling mechanism which is adapted to first buckle the sheet, then elevate the buckled portions of the sheet and shift the entire sheet upon the pile, and finally stretch or straighten out the elevated and separated edge of the sheet. In this latter construction the preferred means for accomplishing the result are the pneumatic bucklers, which have the forward-and-back movement and the upward-and-downward movement, the backward movements being carried a little beyond the initial position of the buckling devices.

I have found from an actual trial of my improved mechanism upon certain kinds of paper that the shifting of the entire sheet upon the pile and the stretching of the lifted edge of the sheet so completely loosens the sheet upon the pile that it can be readily fed off from the pile without blowing air under the sheet. In some cases, however, the sheets will not separate so readily, and it then becomes necessary to utilize the air-blasts to assist in separating the sheets.

To effectively stretch or straighten out the lifted edge of a sheet, it is essential that the buckling-fingers move outwardly in raised position to points beyond the lowered positions assumed by the bucklers at the moment of starting inward to buckle the corners of the sheet. This is necessary for several reasons. In the first place the buckling-fingers may slip a little before they secure a firm hold on the sheet on the inward movements. In the second place the pile usually has an undulating surface, and the greater movement of the buckling-fingers outwardly in elevated position will compensate for this slack or looseness in the edge of the sheet.

As stated above, I prefer to employ the pneumatic or suction devices as the means by which the sheet-moving instruments will engage a sheet for lifting and stretching it; but I would have it understood that I do not limit myself to the use of such suction devices.

I may use other forms of sheet engaging and moving devices for accomplishing the results described.

Having thus described my invention, what I claim as new therein, and desire to secure by Letters Patent, is—

1. In a paper-feeding machine, the combination of a support for a pile of sheets, with a sheet-moving instrument capable of moving transversely and longitudinally with relation to the pile, and means for operating said sheet-moving instrument adapted to cause it to first buckle one edge of a sheet by its movement transversely of the pile, and next shift the sheet bodily upon the pile by its movement longitudinally of the pile, substantially as set forth.

2. In a paper-feeding machine, the combination of a support for a pile of sheets, and suitable feeding devices adapted to feed sheets on the pile, with a sheet-separating instrument capable of moving transversely and longitudinally with relation to the pile, and means for operating said sheet-moving instrument adapted to cause it to first buckle one edge of a sheet by its movement transversely of the pile, and next shift the sheet bodily upon the the pile by its movement longitudinally of the pile, substantially as set forth.

3. In a paper-feeding machine, the combination of a support for a pile of sheets, and suitable feeding devices adapted to feed sheets on the pile, with a sheet-moving device capable of moving transversely, longitudinally and vertically with relation to the pile, and means for operating the sheet-separating instrument adapted to cause it to first buckle one edge of the sheet by its movement transversely of the pile and next simultaneously raise the buckled edge of the sheet and shift the sheet bodily upon the pile by its longitudinal and vertical movements with relation to the pile, substantially as set forth.

4. In a paper-feeding machine, the combination of a support for a pile of sheets, with sheet-separating devices constructed and arranged to reciprocate horizontally over the pile, move up and down with relation to the pile, and laterally toward the rear edge of the pile, said separating devices being adapted to buckle and raise one edge of a sheet from the pile and then by the lateral movement shift the entire sheet rearwardly upon the pile, and suitable sheet-feeding devices adapted to feed the sheet forwardly on the pile, substantially as set forth.

5. In a paper-feeding machine, the combination of a support for a pile of sheets, and suitable feed devices adapted to feed a sheet on the pile, with separating devices adapted to raise an edge of a sheet from the pile, shift the entire sheet upon the pile and stretch or straighten out the raised edge of the sheet above the pile, substantially as set forth.

6. In a paper-feeding machine, the combination of a support for a pile of sheets, with a pair of sheet-buckling devices adapted to first buckle and then raise an edge of a sheet upon the pile, shift the entire sheet upon the pile, and stretch or straighten out the raised edge of the sheet between them above the pile, substantially as set forth.

7. In a paper-feeding machine, the combination of a support for a pile of sheets, and suitable sheet-feeding devices adapted to feed a sheet on the pile, with sheet-separating devices adapted to buckle and raise an edge of a sheet upon the pile, shift the entire sheet upon the pile and stretch the raised edge of the sheet above the pile, substantially as set forth.

8. In a paper-feeding machine, the combination of a support for a pile of sheets, with a suctional sheet-moving device, means controlling the suction in said device, means for reciprocating and raising and lowering the sheet-moving device with relation to the pile, and means for moving said device laterally of its direction of reciprocation, substantially as set forth.

9. In a paper-feeding machine, the combination of a support for a pile of sheets, with a suctional sheet-moving device, means for controlling the suction in said device, means for raising and lowering and reciprocating said sheet-moving device with reference to the pile, and means, thrown into operation by the raising of said device, for shifting said sheet-moving device laterally of its direction of reciprocation, substantially as set forth.

10. In a paper-feeding machine, the combination of a support for a pile of sheets, with a suctional sheet-moving device adapted to engage a sheet, means for imparting a forward and back and lateral movements to said sheet-moving device, means for raising and lowering said sheet-moving device, and means controlling the suction of said device adapted to cause said device to engage a sheet, move it inwardly, raise it from the pile and shift it bodily on the pile, and means for blowing air under the lifted edge of the sheet for completely separating it from the pile, substantially as and for the purpose set forth.

11. In a paper-feeding machine, the combination of two oppositely-arranged suctional sheet-buckling devices means for reciprocating the buckling devices inwardly and outwardly over a pile of sheets, means for raising and lowering the buckling devices with relation to the pile, means for shifting said buckling devices laterally of their line of reciprocation, means controlling the suction of said devices adapted to cause them to engage a sheet at two points, move inwardly with the engaged parts, raise the engaged parts of the sheet from the pile, shift the entire sheet upon the pile, and move away from each other while part of the sheet is raised so as to stretch or straighten out the raised part of the sheet, substantially as set forth.

12. In a paper-feeding machine, the combination of a support for a pile of sheets, a reciprocating arm, a sheet-moving instrument joined to said arm and capable of moving up and down and laterally thereon, means for operating said reciprocating arm, and means for raising and lowering and moving laterally the sheet-moving instrument, substantially as set forth.

13. In a paper-feeding machine, the combination of a support for a pile of sheets, a sheet-buckling finger having means for engaging and raising a sheet, means for reciprocating and raising and lowering said buckling-finger, a stationary bracket-arm, and a part connected with the buckling-finger adapted to engage said bracket-arm when the buckling-finger is raised and cause the buckling-finger to be shifted laterally, as set forth.

14. In a paper-feeding machine, the combination of a support for a pile of sheets, a buckler-supporting frame, an operating-lever mounted thereon, a buckling-finger having a laterally-yielding pivotal connection with the operating-lever, a buckler-elevating lever, a link connecting the buckling-finger and elevating-lever and having a laterally-yielding connection with said lever, a shaft, cams on said shaft operating said levers, a bracket-arm on the buckler-supporting frame, and a finger connected with one of said parts and adapted to engage said bracket-arm for moving the buckling-finger laterally, as set forth.

15. In a paper-feeding machine, the combination of a support for a pile of sheets, with two oppositely-operating sheet-moving instruments capable of engaging and raising a sheet from the pile, means for raising and lowering said instruments, and means for moving said instruments toward each other in lowered position and away from each other a greater distance in elevated position, substantially as set forth.

16. In a paper-feeding machine, the combination of a support for a pile of sheets, with a sheet-buckling instrument, means for raising and lowering said instrument, means for reciprocating said instrument inwardly and outwardly and means for moving said instrument rearwardly of the pile; said raising and lowering means, reciprocating means and rearwardly-moving means being constructed and arranged relatively to cause said buckling instrument to move inwardly in lowered position, rearwardly while it is being raised, and outwardly in raised position to a point beyond the position from which said instrument starts its inward movement in lowered position, as set forth.

TALBOT C. DEXTER.

Witnesses:
J. Green,
Wm. E. Knight.